United States Patent [19]

Wilkinson

[11] Patent Number: 4,689,697

[45] Date of Patent: Aug. 25, 1987

[54] REPRODUCING DIGITAL AUDIO SIGNALS

[75] Inventor: James H. Wilkinson, Basingstoke, England

[73] Assignee: Sony Corporation, Tokyo, Japan

[21] Appl. No.: 772,409

[22] Filed: Sep. 4, 1985

[30] Foreign Application Priority Data

Sep. 18, 1984 [GB] United Kingdom ................. 8423541

[51] Int. Cl.$^4$ ........................................... H04N 5/782
[52] U.S. Cl. .................................... 360/19.1; 358/343
[58] Field of Search ...................... 360/19.1, 9.1, 33.1, 360/39, 38.1; 358/341, 343

[56] References Cited

U.S. PATENT DOCUMENTS 4,468,710  8/1984  Hashimoto et al. ........... 360/33.1 X
4,477,844 10/1984  Nakano et al. ................ 360/38.1 X
4,547,816 10/1985  Sochor ........................... 360/19.1 X Primary Examiner—Robert L. Richardson Attorney, Agent, or Firm—Lewis H. Eslinger; Alvin Sinderbrand

[57] ABSTRACT

A method of and apparatus for reproducing digital audio data which have been recorded in oblique tracks on a magnetic tape in association with digital video data is provided, the audio data in each track having been assembled as blocks of audio data words for recording, and the audio data words having been shuffled in order over a predetermined distance greater than one block prior to recording. In the method, in a slow motion reproduction mode, the recorded audio data is reproduced at a speed lower than the normal reproducing speed, and on a first occasion that any given block of audio data words is reproduced in complete form, that block of audio data words is stored, and each stored block of audio data words is read out under control of a read clock signal the frequency of which is adjusted to correspond to the reproduction speed, whereby the audio data is reproduced with a change in pitch. In a fast motion reproduction mode fragments of the audio data are reproduced without a change in pitch.

9 Claims, 5 Drawing Figures

REPRODUCING DIGITAL AUDIO SIGNALS

BACKGROUND OF THE INVENTION

1. Field of the Invention

This invention relates to methods of and apparatus for reproducing digital audio signals, more particularly where the audio signal is associated with a video signal and reproduction is at a speed different from the normal reproducing speed.

2. Description of the Prior Art

It is known to record digital audio signals in oblique tracks on a magnetic tape together with digital video signals, using a digital video tape recorder (VTR). When the digital VTR is reproducing in a special mode using a speed different from the normal reproducing speed, so as to achieve reproduction of the video signal in slow or fast motion in the forward or reverse direction, it is clearly impossible to achieve perfect reproduction of the audio signal. In previously proposed digital VTRs therefore it has been usual, when operating in such special reproduction modes, for the audio signal to be reproduced in an extremely imperfect form, amounting generally to little more than a squealing sound, or alternatively, for the audio signal to be muted. Neither of these alternatives is very satisfactory, particularly in the case of editing, where it would be helpful at least to be able to identify gaps in the audio signal or significant changes in the content of the audio signal, for example, where a piece of music begins or ends.

SUMMARY OF THE INVENTION

One object of the present invention is to provide an improved method of reproducing digital audio data at speeds different from the normal reproduction speed.

Another object of the present invention is to provide a method of reproducing digital data with a change in pitch in a slow motion reproduction mode.

Another object of the present invention is to provide a method of reproducing digital audio in fragments in a fast motion reproduction.

According to the present invention there is provided a method of reproducing digital audio data which have been recorded in oblique tracks on a magnetic tape in association with digital video data, the audio data in each said oblique track having been assembled as blocks of audio data words for recording, and the audio data words having been shuffled in order over a predetermined distance greater than one said block of audio data words prior to recording, the method comprising:

in a slow motion reproduction mode:

reproducing said recorded audio data at a speed lower than the normal reproducing speed;

on a first occasion that any given said block of audio data words is reproduced in complete form, storing said complete block of audio data words; and reading out each said stored complete block of audio data words under control of a read clock signal the frequency of which is adjusted to correspond to said lower speed, whereby said audio data is reproduced with a change in pitch.

According to the present invention there is also provided apparatus for reproducing digital audio data which have been recorded in oblique tracks on a magnetic tape in association with digital video data, the audio data in each said oblique track having been assembled as blocks of audio data words for recording, and the audio data words having been shuffled in order over a predetermined distance greater than one said block of audio data words prior to recording, the apparatus comprising:

a digital video tape recorder operative in a slow motion reproduction mode for reproducing said recorded audio data at a speed lower than the normal reproducing speed;

a store arrangement operative on the first occasion that any given said block of audio data words is reproduced in complete form, to store said complete block of audio data words; and a read clock signal generator for generating a read clock signal under control of which each said stored complete block of audio data words is read out of said store arrangement, said read clock signal generator being operative to adjust the frequency of said read clock signal to correspond to said lower speed, whereby said audio data is reproduced with a change in pitch.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
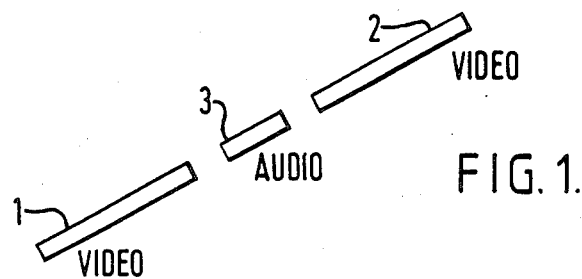
FIG. 1 shows diagrammatically an example of an oblique track recorded on a magnetic tape.

FIG. 1 shows one example of how digital audio signals may be recorded by a digital VTR in association with a digital video signal in an oblique track on a magnetic tape. In this example each oblique track comprises video portions 1 and 2 at the beginning and end respectively of the oblique track, and an audio portion 3 in the centre of the oblique track. The precise arrangement of the audio and video data is, however, not critical to the present invention. In a particular example of a four-head digital VTR for use with a 625-line 50-field per second television signal, the video signal of one field occupies twelve such oblique tracks. Moreover, each of the audio portions 3 comprises four audio sectors, and each of these audio sectors comprises six error-detection blocks of audio data. In this example, the audio signals recorded in the audio portions 3 correspond to four channels of audio.

Figure 2:
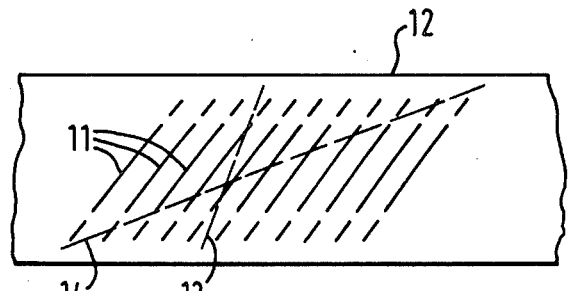
FIG. 2 shows diagrammaticlly a pattern of oblique tracks recorded on a magnetic tape.

FIG. 2 shows a successive plurality of oblique tracks 11 recorded on a magnetic tape 12, and also indicates by traces 13 and 14 the path of a reproducing head during slow and fast motion reproduction, respectively. The present invention is applicable whether or not dynamic tracking is used; dynamic tracking being achieved by mounting each reproducing head on a rotary drum of the digital VTR by way of a controllable element such as a bimorph leaf, so that by deriving a control signal from the signal reproduced by the reproducing head and feeding the control signal back to the controllable element, the reproducing hed can be made to follow each oblique track 11 more closely. However, the effect of such dynamic tracking will be simply to give the track 13 a stepped appearance indicating that for an intervl the reproducing head will follow an oblique track 11 more closely, but it will then jump to a different oblique track 11. In fast motion reproduction the dynamic trackings become ineffective above about double the normal reproducing speed. Thus, whether or not dynamic tracking is used, the reproduced signal will contain repetitions and noise in slow motion reproduction and will contain discontinuities and noise in fast motion reproduction.

So far as the video signal is concerned, these imperfections in the reproduced signal are quite readily dealt with, because time-base changes are acceptable to a viewer. Thus after error correction and concealment, the reproduced video signal can be stored in a field or frame store arrangement from which a visually acceptable slow motion display can be derived by field or frame repetition, and a visually acceptable fast motion display can be derived, at least up to a small multiple of the normal reproduction speed, by field or frame omission. At least the technique used in slow motion for reproduction of the video signal cannot be applied to the audio signals, as repetition of audio fragments gives an unintelligible result. It has therefore been usual in special reproduction modes either to allow the reproduced audio signals to degenerate into a squealing sound or, alternatively, to mute them.

Using embodiments of the present invention some improvement in the intelligibility of the reproduced audio signals can be achieved. The effect is that in slow motion reproduction in the forward direction, reproduction of all or most of the audio data is achieved with a change in the pitch of the sounds. This is similar to the effect achieved when an analog audio tape recorder is operated at less than the normal reproducing speed. A similar effect is achieved in slow motion reproduction in the reverse direction, that is with the time base of the sounds reversed relative to the recording direction, or in segments each of which is reproduced in the forward direction. In fast motion reproduction in the forward direction reproduction of isolated segments of the audio data is achieved without changing the pitch of the sounds. In fast motion reproduction in the reverse direction each segment is reproduced in the forward or the reverse direction.

An embodiment of apparatus in accordance with the present invention will now be described with reference to FIGS. 3 to 5, which show respective parts of the apparatus in block form.

Figure 3:
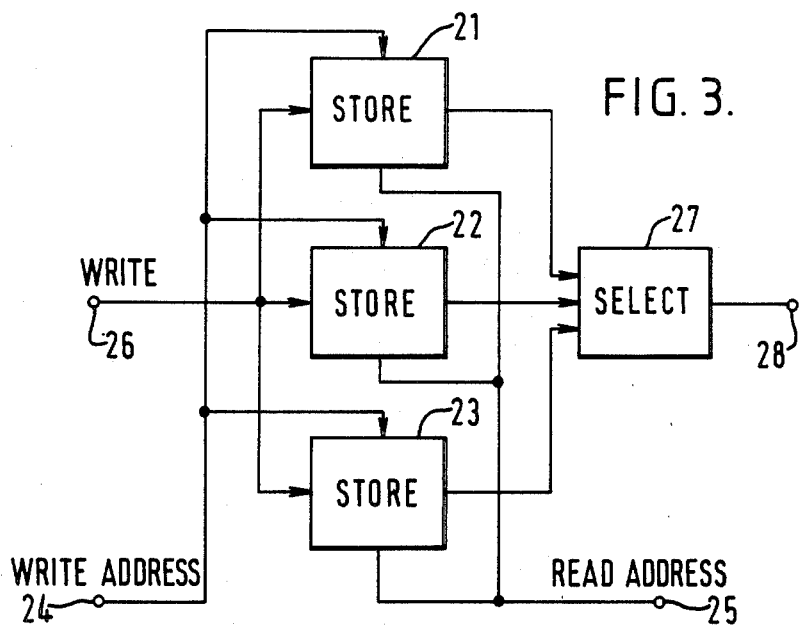
FIG. 3 shows in block form part of an embodiment of apparatus for reproducing digital audio signals.

Referring first to FIG. 3, this shows in simplified form a store arrangement comprising first, second and third audio data stores 21, 22 and 23, each of which is formed by a random access memory (RAM). Write addresses can be supplied to each of the stores 21 to 23 by way of a write address input terminal 24, and read addresses can be supplied to each of the stores 21 to 23 by way of a read address input terminal 25. Audio data which may be written in the store arrangement are supplied to each of the stores 21 to 23 by way of an audio data input terminal 26, and audio data read out of the stores 21 to 23 are derived by a 3:1 selector 27 for supply to an audio data output terminal 28. Writing and reading is controlled to move around the stores 21 to 23 cyclically such that no store 21 to 23 is read from while it is being written in, and no store 21 to 23 is written in while it is being read from.

Figure 4:
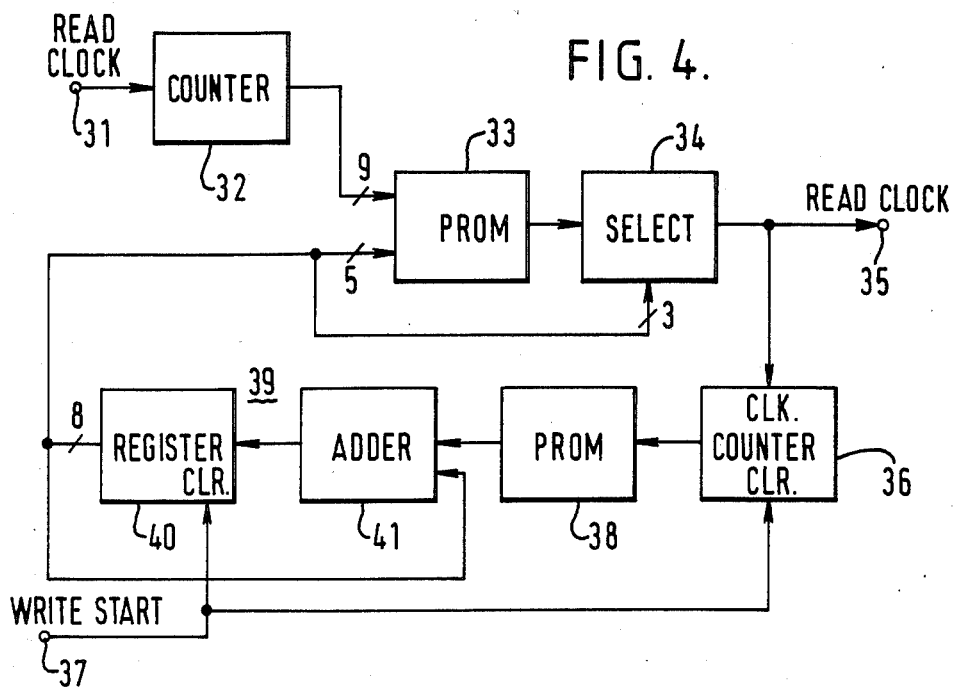
FIG. 4 shows in block form another part of the embodiment of FIG. 3.

Referring next to FIG. 4, this shows in simplified form an arrangement for generating a read frequency which in effect simulates analog slow motion audio reproduction. The arrangement comprises an input read clock terminal 31 to which an input read clock signal having a frequency higher than the normal reading speed is supplied from a suitable source. The input read clock signal is supplied to a binary counter 32, the output of which is supplied to a programmable read-only memory (PROM) 33, the output of which is connected by way of a selector 34 to an output read clock terminal 35. The output of the selector 34 is also supplied to the clock terminal of a counter 36.

The arrangement also includes a write start terminal 37 which is connected to the clear terminal of the counter 36. The output of the counter 36 is supplied to a PROM 38, the output of which is supplied to an accumulator 39 comprising a register 40 and an adder 41. The output of the PROM 38 is connected to the adder 41, the output of which is connected to the register 40. The register 40 supplies outputs to the PROM 33, the selector 34, and also a feedback to the adder 41. The write start terminal 37 is also connected to the clear terminal of the register 40.

The operation of the arrangement of FIG. 4 is as follows. The frequency of the input read clock signal is divided by 512 by the counter 32, and the divided signal which is a 9-bit signal is supplied to the PROM 33. The operation of the PROM 33 and the selector 34 is to enable a predetermined number of positive edges of the signal supplied by the counter 32 to form an output read clock signal which is supplied to the output read clock terminal 35. The number of positive edges enabled is variable over a wide range under control of an 8-bit control signal supplied by the register 40, five bits of the control signal being supplied to the PROM 33 and three bits of the control signal being supplied to the selector 34. Thus if, for example, the control signal corresponds to the number 1, one only of the positive edges is selected from each binary sequence supplied by the counter 32, if the control signal corresponds to the number 2, two positive edges are selected, and so on. If more than one positive edge is selected from any of the binary sequences, then the selected positive edges are optimally spaced in time.

The positive edges selected are also supplied to the counter 36 where they are counted, the counter 36 being reset every time there is a new write start as indicated by a write start signal supplied to the write start terminal 37. Such a write start signal, which will be referred to in more detail below, is supplied each time the audio information which is being written in the store arrangement of FIG. 3 changes, and this may occur, for example, each time the audio information which is being reproduced is found to relate to a different oblique track 11 or scan of the magnetic tape 12. In a particular example, each oblique track 11 on the magnetic tape 12 corresponds to 324 audio samples, and so in that particular example the counter 36 is looking for 324 positive edges between successive write start signals. Clearly, however, 324 such positive edges will only be counted if reproduction of the audio signal is taking place at normal speed. In slow motion reproduction, the period between successive write start signals will be longer than the normal period, so assuming the digital VTR has just been switched to slow motion reproduction from normal reproduction, the counter 36 will in the next period count more than 324 positive edges.

The operation of the PROM 38 is to off-set the count of the counter 36 relative to the normal count. That is to say, in the present example where the normal count is 324, the PROM 38 equates this to zero and any higher count is recorded as a positive number and any lower count is recorded as a negative number. The recorded count is accumulated in the accumulator 39 in the intervals between successive write start signals clearing the register 40. The register 40 therefore supplies the necessary control signal to the PROM 33 and the selector 34, so that the number of positive edges selected from the output of the counter 32 is moved upwards or downwards as appropriate to try and bring the maximum count of the counter 36 to the required number, which in the present example is 324.

The effect is therefore that the frequency of the output read clock signal at the output read clock terminal 35 is increased or decreased, with some time lag, to correspond to the degree of slow motion. If, for example, the digital VTR is operating at half the normal reproducing speed, so that the period between write start signals supplied to the write start terminal 37 has increased to double the normal interval, then the frequency of the output read pulse signal at the output read clock terminal 35 will fall to half the frequency corresponding to the normal reproducing speed frequency. The output signal can then be re-sampled at the normal sampling rate, for example 48 KHz, and this may be done in a digital-to-analog converter stage. This will have the desired effect of making the output reproduced sound similar to that which would be obtained from an analog audio tape recorder reproducing at half speed. That is to say, the sound will be reproduced with a change in pitch, so that gaps in the audio signal or any substantial change in the audio signal, such as the beginning or the end of a piece of music, can readily be identified.

Figure 5:
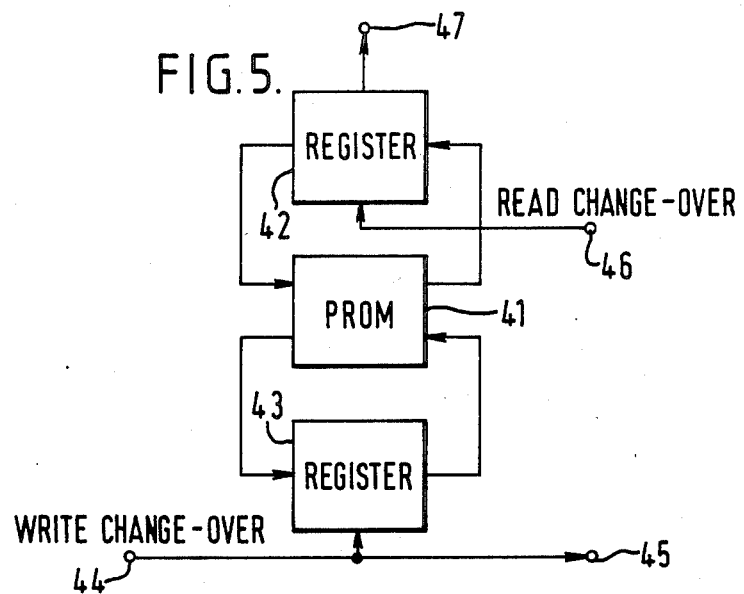
FIG. 5 shows in block form yet another part of the embodiment of FIG. 3.

Referring now to FIG. 5, this shows in simplified form a store control arrangement comprising a PROM 41 which receives inputs from and supplies outputs to registers 42 and 43. The write start signals previously referred to are supplied to a write change-over input terminal 44 which is connected to another input of the register 43 and also to an output terminal 45 which is connected to the write start terminal 37 of FIG. 4. Read start signals which are derived from the read clock signal in FIG. 4 are supplied to a read change-over input terminal 46 which is connected to another input of the register 42. The register 42 also has an output terminal 47 which is connected to the store arrangement of FIG. 3.

The operation of the arrangement of FIG. 5 is as follows. It is first necessary to consider in slightly more detail how the audio signals are recorded in the oblique tracks 11 on the magnetic tape 12. In order to reduce the detrimental effects of lost audio data, that is to say audio data which fails to be reproduced satisfactorily, whether due to drop-out, head clogging, damage to the magnetic tape 12, reproduction in special reproduction modes, or any other reason, the audio data has associated with it an error-correcting code and an error-detecting code, in addition to an address structure, and moreover the audio data words to be recorded are shuffled over a predetermined distance in known manner, in particular to reduce the effect on concealment of any temporary drop-out. The shuffling distance may be selected to be any convenient distance such as a field, but in the present example it will be assumed that the shuffling distance is one head scan. Thus, the boundaries between audio data read from different head scans correspond to shuffling boundaries of the shuffling groups. As mentioned above, within each audio portion 3 in the oblique tracks, the audio data is divided into error detection blocks. One error-detection block is therefore the minimum mount of audio data that can be satisfactorily reproduced.

Each time a shuffling boundary is detected on reproduction, a write start signal is supplied to the write change-over input terminal 44. Each of the registers 42 and 43 is a 3-bit counter, plus a fourth bit to indicate whether reading/writing is inhibited or valid, which in the steady state indicates the current writing and reading condition of the store arrangement of FIG. 3. This condition continues until a write start signal is received at the write change-over input terminal 44 and supplied to the register 43, whereupon the register 43 is shifted and the shifted output is supplied to the PROM 41. The PROM 41 thereupon controls the register 42 to shift to a new writing and reading condition which is supplied to the output terminal 47 and also fed back to the register 43. The operation of the PROM 41 is such that the above-mentioned writing and reading condition of the stores 21 to 23 of FIG. 3 is maintained, that is to say, no store 21 to 23 is written in while it is being read from, and no store 21 to 23 is read from while it is being written in. To enable this condition to be maintained at all times there must be at least three stores 21 to 23, but more than three stores 21 to 23 may be provided if required.

As mentioned above, the minimum amount of audio data that be satisfactorily reproduced is that corresponding to one error-detection block. Each time a block of audio data corresponding to such an error-detection block is satisfactorily reproduced, it is supplied to the store arrangement of FIG. 3 for writing. Whether it is actually written will depend upon a write control within the store arrangement. Thus, in slow motion reproduction, it is not essential to rewrite in one of the sotres 21 to 23 any block of audio data which has already been written previously, while in fast motion reproduction is is essential not to write into that one of the stores 21 to 23 currently being written into, any block of audio data unless it belongs to the same shuffling group as any block of audio data already written in that one of the stores 21 to 23. To achieve this, the head scans are numbered sequentially and each block of audio data within each head scan incorporates data giving the head scan number. When any block of audio data is satisfactorily reproduced, therefore, the head scan number will be available and if that block of audio data is the first to be written in any one of the stores 21 to 23, the head scan number is also stored. As successive blocks of audio data are presented to the store for writing, therefore, the head scan number is first checked against the head scan number already stored, and if it is not the same then the associated block of audio data is not written. Likewise, in the case of slow motion reproduction, comparison both of the head scan number and of the audio data block number with what has already been written in that one of the stores 21 to 23 which is currently being written in, controls whether a newly presented block of audio data is written or not. When reading, a read, modify, write operation can be used with a status bit being set to "1" after reading. On writing, the status bit is set to "0". The foregoing assumes that the shuffling distance is one head scan, but if it is, for example, one field, corresponding to three head scans, then the control is effective to accept for writing or reject for re-writing any block of audio data having a head scan number corresponding to a number in the group of three corresponding to one field.

Thus, it will be understood that the above effects can be achieved. That is to say, in slow motion reproduction in the forward direction reproduction of all or most of the audio data is achieved with a change in pitch of the sounds corresponding to the change in the frequency of the read clock signal at the output read clock terminal 35 in FIG. 4. A similar effect is achieved in slow motion reproduction in the reverse direction, and indeed whether sound is reproduced in the forward or reverse direction is purely a question of the order in which the read addresses are supplied to the read address in put terminal 25 in FIG. 3. In fast motion reproduction in the forward or reverse direction reproduction of isolated segments of the audio data is achieved without changing the pitch of the sounds, that is to say the stored audio data is read from the stores 21 to 23 at the normal reproduction speed, but it will be understood that the reproduced sound will consist of isolated segments of the audio data corresponding to what has been successfully reproduced and stored, which in turn depends on the speed of the fast motion reproduction.

It may be found preferable to provide a high frequency filter on the audio output to eliminate distracting high frequency sounds which may occur, in particular due to noise generated at the shuffling boundaries.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of reproducing digital audio data which have been recorded in oblique tracks on a magnetic tape in association with digital video data, the audio data in each said oblique track having been assembled as blocks of audio data words for recording, and the audio data words having been shuffled in order over a predetermined distance greater than one said block of audio data words prior to recording, the method comprising:
   in a slow motion reproduction mode:
   reproducing said recorded audio data at a speed lower than the normal reproducing speed;
   on a first occasion that any given said block of audio data words is reproduced in complete form, storing said complete block of audio data words; and
   reading out each said stored complete block of audio data words under control of a read clock signal the frequency of which is adjusted to correspond to said lower speed, whereby said audio data is reproduced with a change in pitch.

2. A method according to claim 1 wherein the frequency of said read clock signal is adjusted by counting the number of read clocks in said read clock signal in the period taken to reproduce the audio data corresponding to said predetermined distance, comparing the counts so obtained with the number of audio data words recorded in said predetermined distance, nd increasing or decreasing said number of read clocks in said read clock signal in dependence on said count in successive said periods until said frequency corresponds to said lower speed.

3. A method according to claim 2 further comprising:
   in a fast motion reproduction mode:
   reproducing said recorded audio data at a speed greater than the normal reproducing speed;
   on the first occasion than any given said block of audio data words is reproduced in complete form, storing said complete block of audio data words;
   on the first occasion that any further said block of audio data words falling within the same said predetermined distance as said first stored block of audio data words is reproduced in complete fore, storing said further complete block of audio data words in association with said first stored block of audio data words, and not storing any reproduced said block of audio data words falling within a different said predetermined distance in association with said stored blocks of audio data words;
   reading out said stored complete blocks of audio data words under control of a read clock signal the frequency of which corresponds to said normal reproducing speed, whereby fragments of said audio data are reproduced without a change in pitch.

4. Apparatus for reproducing digital audio data which have been recorded in oblique tracks on a magnetic tape in association with digital video data, the audio data in each said oblique track having been assembled as blocks of audio data words for recording, and the audio data words having been shuffled in order over a predetermined distance greater than one said block of audio data words prior to recording, the apparatus comprising:
   a digital video tape recorder operative in a slow motion reproduction mode for reproducing said recorded audio data at a speed lower than the normal reproducing speed;
   a store arrangement operative on the first occasion than any given said block of audio data words is reproduced in complete form, to store said complete block of audio data words; and
   a read clock signal generator for generating a read clock signal under control of which each said stored complete block of audio data words is read out of said store arrangement, said read clock signal generator being operative to adjust the frequency of said read clock signal to correspond to said lower speed, whereby said audio data is reproduced with a change in pitch.

5. Apparatus according to claim 4 wherein said read clock signal generator comprises a counter for counting the number of read clocks in said read clock signal in the period taken to reproduce the audio data corresponding to said predetermined distance, means for comparing the counts so obtained with the number of audio data words recorded within said predetermined distance, and means to increase or decrease said number of read clocks in said read clock signal in dependence on said count in successive said periods until said frequency corresponds to said lower speed.

6. Apparatus according to claim 4 wherein said store arrangement comprises three stores and a store control operative such that none of said stores is written in while that store is being read from, and none of said stores is read from while that store is being written in.

7. Apparatus according to claim 6 wherein said digital video tape recorder is operative in a fast motion reproduction mode to reproduce said recorded audio data at a speed greater than said normal reproducing speed, said store control is operative in said fast motion reproduction mode such that on the first occasion that any given said block of audio data words is reproduced in complete form said complete block of audio data words is stored in one of said stores, on the first occasion that any further said block of audio data words from the same said predetermined distance as said first stored block of data words is reproduced in complete form, said further block of data words is stored in the same said store, and no reproduced said block of audio data words from a different said predetermined distance is stored in the same said store, and in said fast motion reproduction mode said read clock signal generator is operative to generate said read clock signal at a frequency corresponding to said normal reproducing speed.

8. Apparatus according to claim 4 wherein said predetermined distance is one head scan of said digital video tape recorder.

9. Apparatus according to claim 4 wherein said predetermined distance is one field of the television signal recorded by said digital video tape recorder.

* * * * *